United States Patent
Ennis (10) Patent No.: US 7,293,316 B2
(45) Date of Patent: Nov. 13, 2007

(54) VEHICLE WASHING APPARATUS WITH ADJUSTABLE BUMPER ASSEMBLY AND MOVABLE BRUSH ARM PIVOT POINT

(76) Inventor: G. Thomas Ennis, 235 W. Florence Ave., Inglewood, CA (US) 90301

( * ) Notice: Subject to any disclaimer, the term of this patent is extended or adjusted under 35 U.S.C. 154(b) by 598 days.

(21) Appl. No.: 10/861,516

(22) Filed: Jun. 7, 2004

(65) Prior Publication Data

US 2005/0268411 A1 Dec. 8, 2005

(51) Int. Cl.
*B60S 3/06* (2006.01)

(52) U.S. Cl. .......................... 15/53.3; 15/53.2

(58) Field of Classification Search ........ 15/53.1–53.3, 15/97.3

See application file for complete search history.

(56) References Cited

U.S. PATENT DOCUMENTS

| | | | |
|---|---|---|---|
| 3,594,843 A | 7/1971 | Sesia | |
| 3,747,151 A * | 7/1973 | Takeuchi | ............... 15/53.2 |
| 3,852,842 A * | 12/1974 | Weigele et al. | ............... 15/53.3 |
| 3,892,002 A * | 7/1975 | Horner et al. | ............... 15/53.3 |
| 3,913,161 A | 10/1975 | Takeuchi | |
| 3,921,243 A | 11/1975 | Takeuchi | |
| 3,926,663 A | 12/1975 | Gray | |
| 4,035,862 A | 7/1977 | Ennis et al. | |
| 4,225,995 A | 10/1980 | Ennis | |
| 4,424,602 A | 1/1984 | Belanger et al. | |
| 4,445,246 A | 5/1984 | Hanna | |
| 4,935,982 A * | 6/1990 | Ennis | ............... 15/53.3 |
| 5,930,859 A | 8/1999 | Ennis | |
| 6,264,754 B1 * | 7/2001 | Bowman | ............... 134/6 |

* cited by examiner

*Primary Examiner*—Mark Spisich
(74) *Attorney, Agent, or Firm*—Mattingly, Stanger, Malur & Brundidge, P.C.

(57) ABSTRACT

A vehicle washing apparatus includes a pair of spaced movable brush assemblies mounted on a frame for movement transversely of the path of a vehicle to be washed. Each movable brush support arm mechanism includes a brush support arm pivotally mounted to a carriage. An adjustable bumper assembly is provided in combination with the movable brush support arm mechanisms whereby the bumper arm automatically moves along with movement of the brush support arm mechanisms to control movement of the brush support arms.

21 Claims, 11 Drawing Sheets

FIG. 7F
SLIDER MOVE IN INNERMOST POSITION

FIG. 7E
LIMIT SWITCH REMAINS ACTIVATED

VEHICLE WASHING APPARATUS WITH ADJUSTABLE BUMPER ASSEMBLY AND MOVABLE BRUSH ARM PIVOT POINT

BACKGROUND OF THE INVENTION

1. Field of the Invention

The present invention relates to an improved vehicle washing apparatus and, more particularly, to such an apparatus having an adjustable bumper assembly in combination with a movable support mechanism for pivotally supporting a brush support arm for a rotary brush whereby the support arm and brush are movable with the movable support mechanism and the bumper assembly automatically moves or adjusts along with movement of the movable support mechanism.

2. Description of the Related Art

Numerous devices are known in the art for washing vehicles by employing rotating brush assemblies for cleaning one or more of the front, sides and back of the vehicle. Many of these prior art devices are relatively complicated in construction and require the use of extensive power control systems to effect the proper movement of the brush assembly to effectively clean a vehicle.

For example, in wrap-around rotating brush assemblies, hydraulic power control systems are often used to move the brush assemblies along the front, sides and back of the vehicle. Such a hydraulic power control systems require close supervision and extensive maintenance and adjustment in order to operate properly. Consequently, these types of devices are expensive to construct, operate and maintain. Other such prior art devices use an articulated arm to support a rotary brush. Other prior art devices employ a single arm for mounting a rotary brush with the arm being pivoted at a stationary point on the frame of the device such as that shown in U.S. Pat. No. 4,225,995.

Still another prior art device such as that shown in my U.S. Pat. No. 5,930,859, which is incorporated herein by reference, employs a movable support mechanism for pivotally supporting a brush support arm whereby the support arm and the brush are movable with the movable support mechanisms.

While such a prior art devices are generally satisfactory, they nevertheless do not always adequately wash the front and rear of the vehicle and at times they bounce off or skip portions of the surface of a vehicle.

SUMMARY OF THE INVENTION

It is object of the present invention to provide a vehicle washing apparatus which avoids the disadvantages of the prior art discussed above by providing a vehicle washing apparatus having an automatically adjustable bumper assembly for use in combination with a movable support mechanism mounted on a frame and having a brush support arm supporting a rotary brush pivotally attached to the movable support arm mechanism for movement therewith whereby the movable support mechanism provides a movable brush arm pivot point.

A further object of the invention is to provide a vehicle washing apparatus having an adjustable bumper assembly and a movable brush arm support mechanism whereby movement of the pivot point and the adjustable bumper assembly increases the dwell time of a brush on a surface of a vehicle and prevents the brush from ricocheting off the vehicle and leaving unwashed surfaces, particularly on the rear of the vehicle.

Another object of the invention is to provide a vehicle washing apparatus having a movable brush support arm mechanism which includes a carriage which is stably supported on tracks extending laterally of the frame of the apparatus.

The present invention achieves the above and other object of the invention by providing a vehicle washing apparatus having a supporting frame extending overhead of the path of a vehicle to be washed and having a pair of spaced brush assemblies mounted on the frame. Each of the brush assemblies includes a movable brush support arm mechanism mounted on the frame for lateral movement thereon with respect to the path. A brush support arm is pivotally mounted at an inner end to the movable brush support arm mechanism and has a brush rotatably mounted at an outer end. A bumper assembly is mounted to the frame between the spaced brush assemblies which includes a mounting arm attached to the frame of the washing apparatus and a bumper arm pivotally attached adjacent an outer end of the mounting arm. The bumper arm is connected to one of the movable brush support arm mechanisms whereby movement of one brush arm mechanism causes movement of the bumper arm so that one end of the bumper arm contacts at least one of the brush support arms to retard movement thereof during washing of a vehicle.

Each of the movable brush support arm mechanisms includes a movable carriage or slider and the bumper arm is connected to one of the carriages by a connecting rod pivotally attached at one end to the carriage and pivotally attached at an opposite end to the bumper arm. Control means, including an actuator mounted on the frame, are provided for moving the carriage of each movable brush support arm mechanism. A limit switch activated and deactivated by movement of one of the brush support arms is provided for controlling movement of each of the actuators.

Each carriage is provided with two pairs of spaced upper rollers which engage a pair of upper tracks mounted on the frame and two pair of spaced lower rollers which engage a pair of lower tracks on the frame. One pair of the rollers has flat outer surfaces which engage one of the tracks having a flat bearing surface and three pairs of the rollers have V-shaped outer surfaces which engage tracks having V-shaped bearing surfaces.

These and other features and advantages of the vehicle washing apparatus of the present invention will become more apparent with reference to the following detailed description and drawings.

DETAILED DESCRIPTION OF THE PREFERRED EMBODIMENTS

Figure 1:
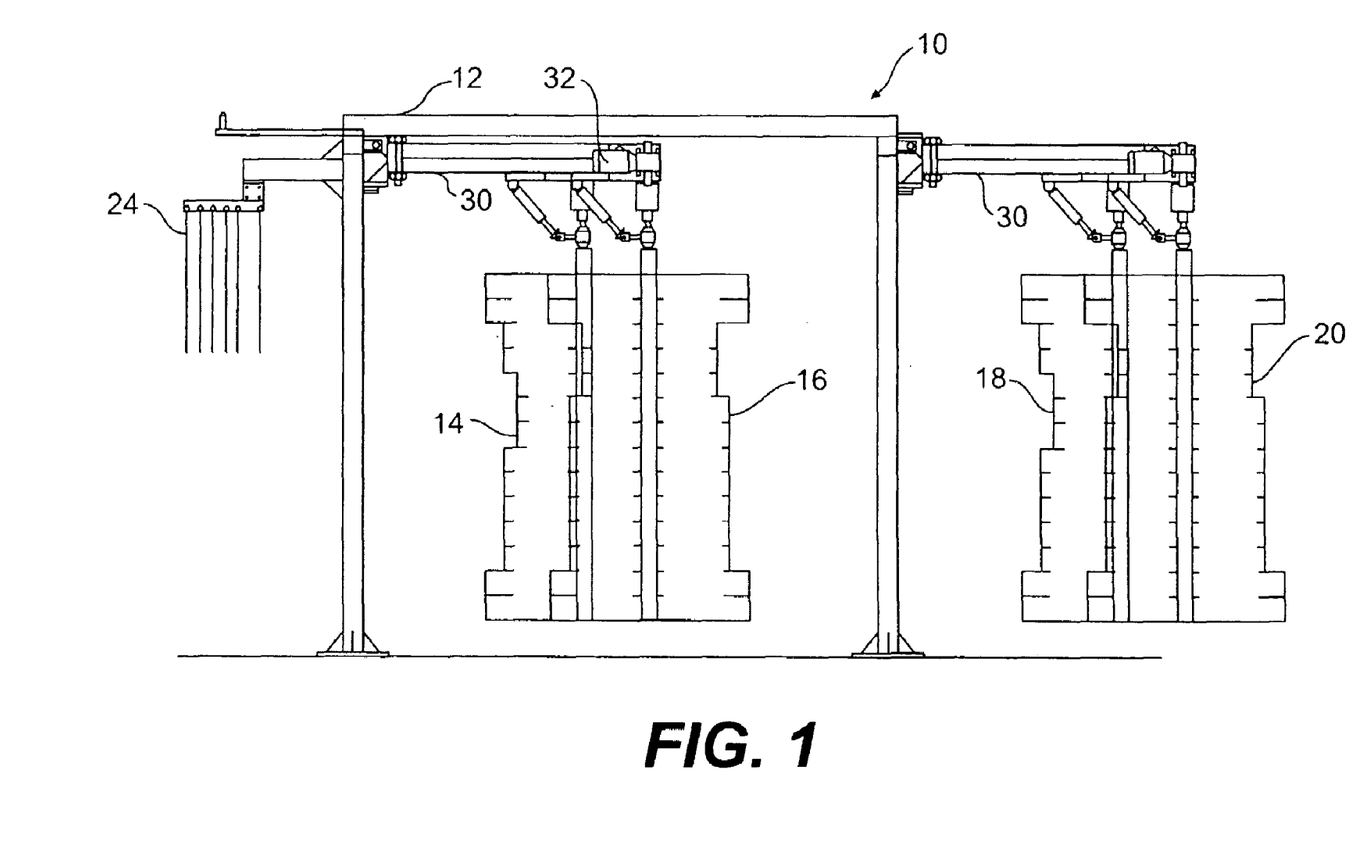
FIG. 1 is a side elevational view of a vehicle washing apparatus according to the present invention.
Figure 2:
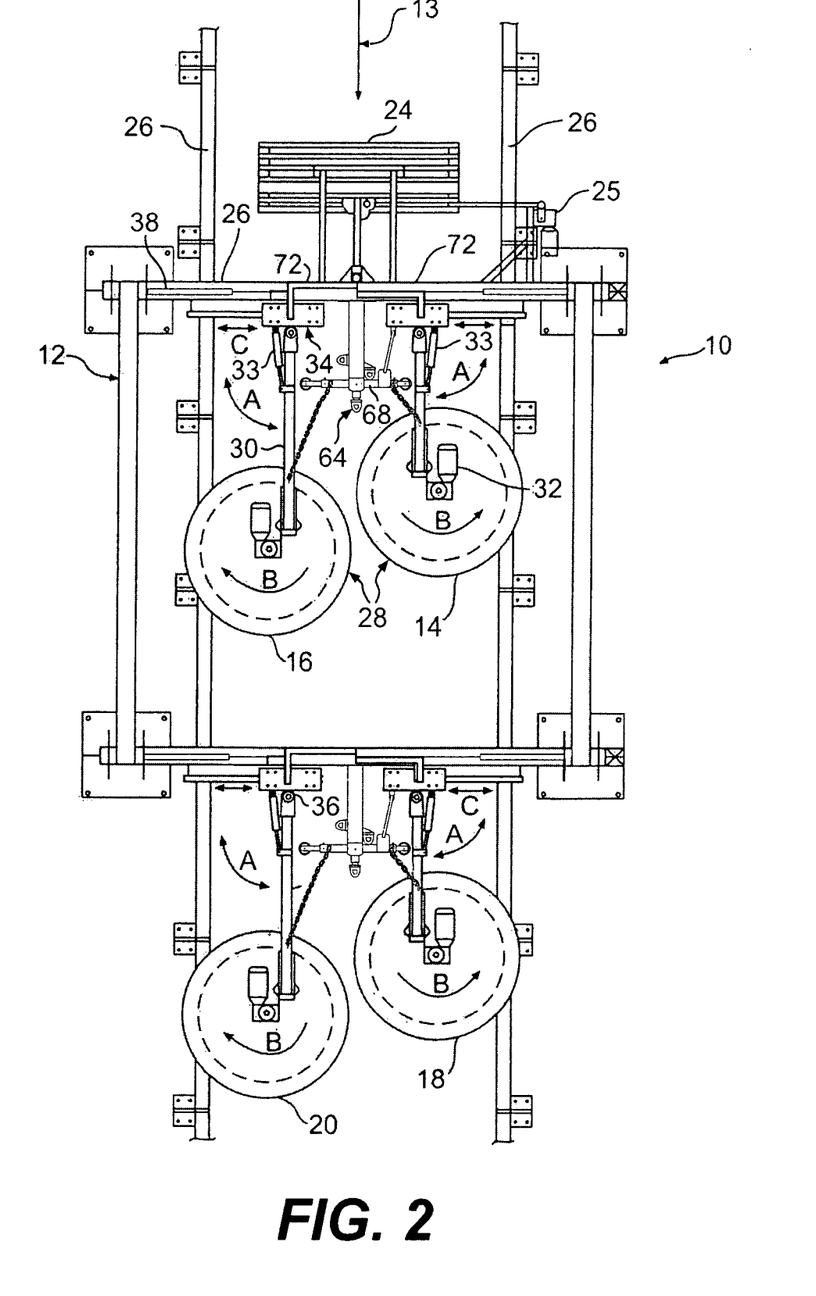
FIG. 2 is a top plan view of the vehicle washing apparatus shown in FIG. 1.

Referring to FIGS. 1 and 2 of the drawings, a vehicle washing apparatus, generally referred to by the numeral 10, is shown which includes a supporting frame 12 extending over a path 13 of a vehicle to be washed. The overhead portion of frame 12 preferably has a first pair of wrap-around rotary brushes 14 and 16 mounted adjacent to front end thereof and a second pair of wrap-around rotary brushes 18 and 20 pivotally mounted to the rear of the frame. Although a pair of brushes are shown in each instance, only a single brush also maybe used.

A top scrubber curtain device 24 also maybe mounted at the front of the frame for reciprocal movement by a motor mechanism 25. As shown in FIG. 2, guide rails 26 may be provided under the vehicle washing apparatus 10 to guide vehicles there through. Instead of guide rails, other suitable means for guiding a vehicle through the washing apparatus maybe used such as tracks or mechanical conveying mechanisms.

Each of the rotary brushes 14, 16, 18 and 20 is part of a rotary brush assembly pivotally connected to a movable brush arm support mechanisms directly mounted overhead on the frame as will be described in greater detail hereafter. Since each of the rotary brush assemblies are the same, only one will be described in detail with reference to FIGS. 1-4. Each rotary brush is rotatably mounted to an end of a brush support arm 30. Each brush support arm 30 is rotatable in a horizontal plane across the path of a vehicle to be washed, as shown by the arrows A adjacent to the brush support arms in FIG. 2. A motor 32 is mounted at the brush end of each support arm for rotating each of the wrap-around brushes in the direction of the arrows B shown in FIG. 2. Brushes 14 and 18 rotate in a counter-clockwise direction while brushes 16 and 20 rotate in a clockwise direction. The direction of rotation is such as to cause the brushes to walk or propel themselves around the surface of the vehicle being washed. The horizontal pivoting movement of each brush support arm 30 around its pivot point may be controlled by an air cylinder or shock absorber 33 attached between the inner end of each support arm and a movable brush arm support mechanism, generally indicated by the numeral 34, mounted for movement along the frame 12.

Figure 3:
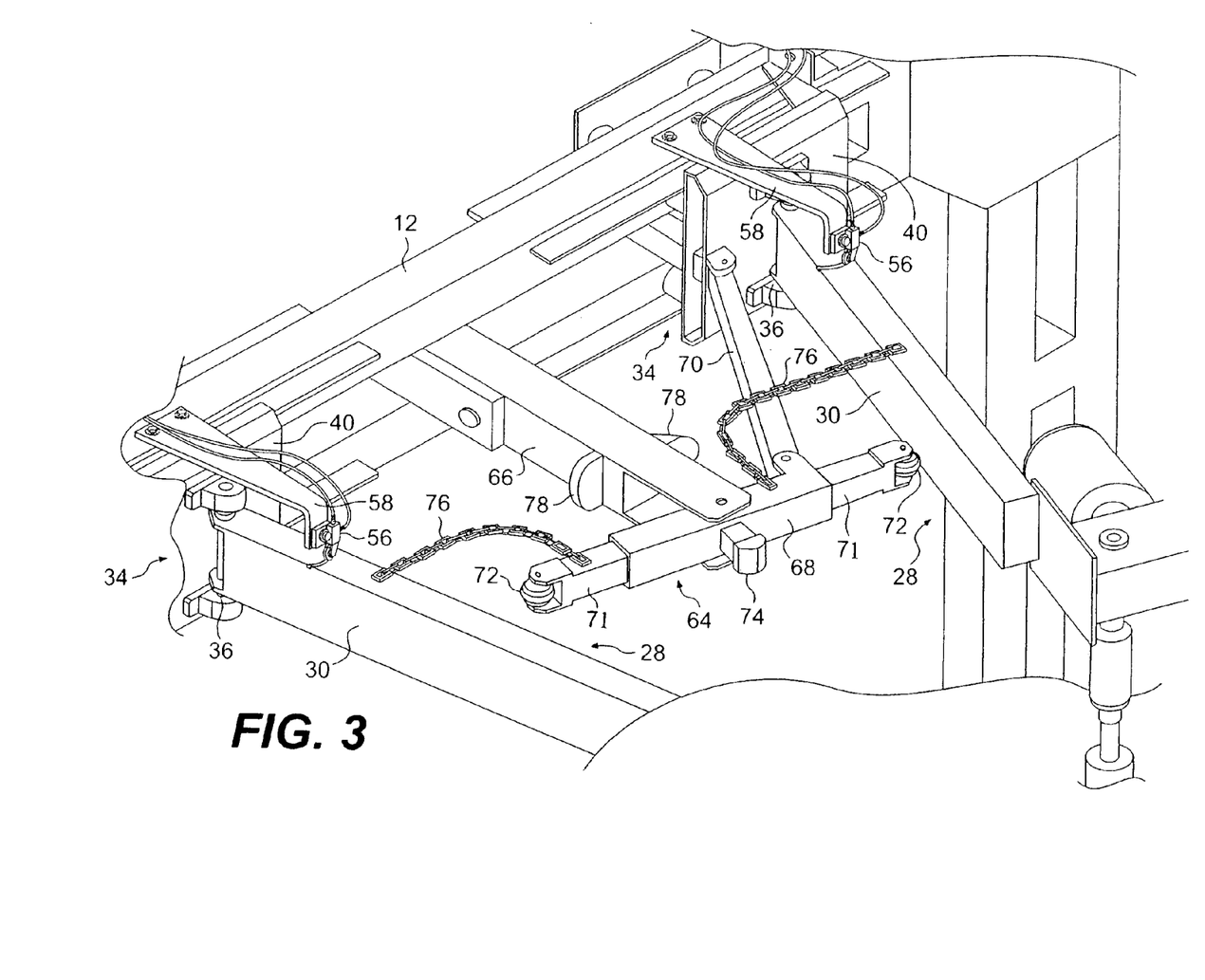
FIG. 3 is an enlarged prospective view of a portion of the vehicle washing apparatus illustrating the movable brush arm support mechanisms pivotally supporting brush arms and having a bumper assembly mounted to the frame between the brush support arm mechanisms.

As most clearly shown in FIGS. 2 and 3, the brush support arm 30 of each rotary brush assembly is pivotally mounted at its inner end at pivot point 36 to a movable brush arm support mechanism 34. The movable support mechanism 34 is mounted for sliding movement along tracks along the top of the frame in a direction transversely of the path of a vehicle to be washed. As indicated by the arrows C in FIG. 2, each movable brush arm support mechanism 30 is movable back and forth with the movement being controlled by suitable cylinder means such as air cylinders 38 attached at one end to the frame and at an opposite end to a movable support mechanism 34. Any other suitable mechanical means for controlling movement of the movable brush arm support mechanism 70 such as a chain or cable means, a linear drive means, or a motor drive means maybe used.

Figure 4:
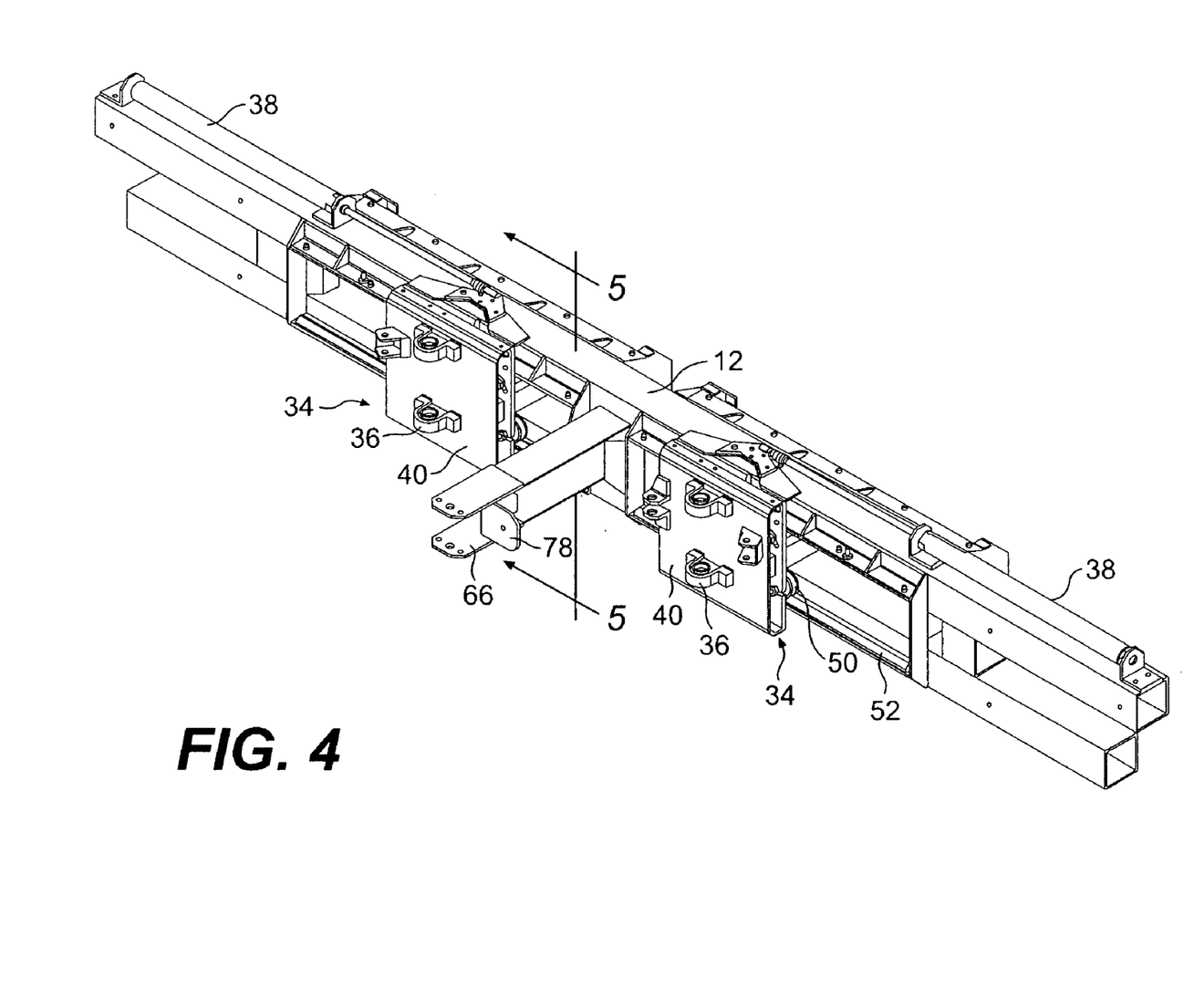
FIG. 4 is a prospective view showing two movable brush support arm mechanisms with carriages mounted on tracks of the frame of the apparatus and having a mounting arm for a bumper arm attached between the brush support arm mechanisms.
Figure 5:
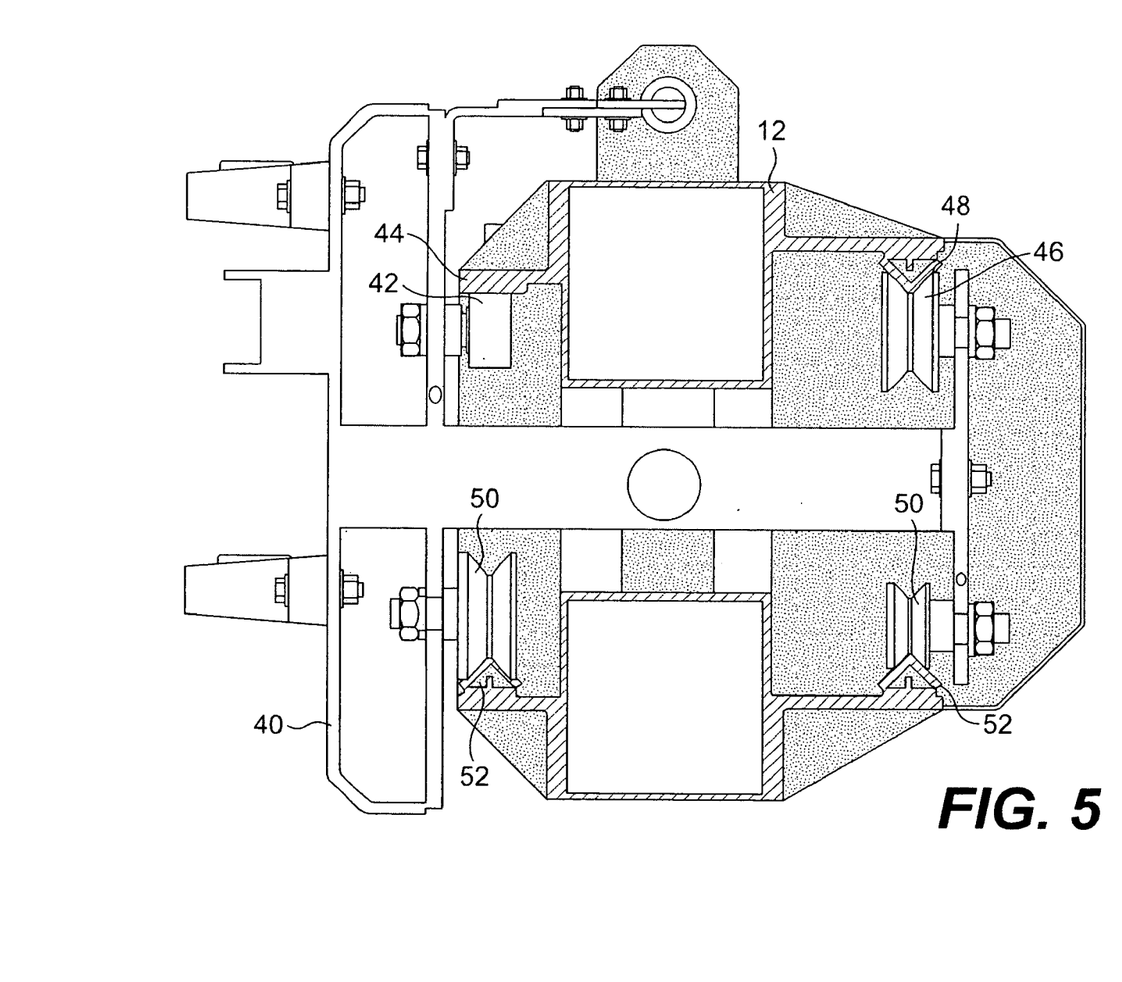
FIG. 5 is a sectional view taking along line 5-5 of FIG. 4 and illustrating the carriage of a brush support mechanism mounted on the tracks of the frame.

As most clearly shown in FIGS. 3, 4 and 5, each movable brush arm support mechanism 34 is comprised of a carriage or slider 40 supported by rollers which run along tracks mounted on the frame. The carriage is provided with two sets of spaced upper rollers and two sets of spaced lower rollers. As shown in FIG. 5, one set of upper rollers 42 engages a track 44 having a flat bearing surface. Rollers 42 also have a flat bearing surface to engage the flat bearing surface of the track 44. An opposite set of upper rollers 46 have V-shaped outer surfaces for engaging a corresponding track 48 having a V-shaped bearing surface. As further shown in FIG. 5, the carriage also has two sets of spaced lower rollers 50 having V-shaped outer surfaces which engage corresponding tracks 52 having corresponding V-shaped outer bearing surfaces. The use of one track and one set of rollers having flat surfaces is advantageous in that it permits easier mounting of the carriage on the tracks. If all of the rollers and all the tracks were V-shaped, it would be hard to properly align the carriage for mounting on the tracks.

Figure 6:
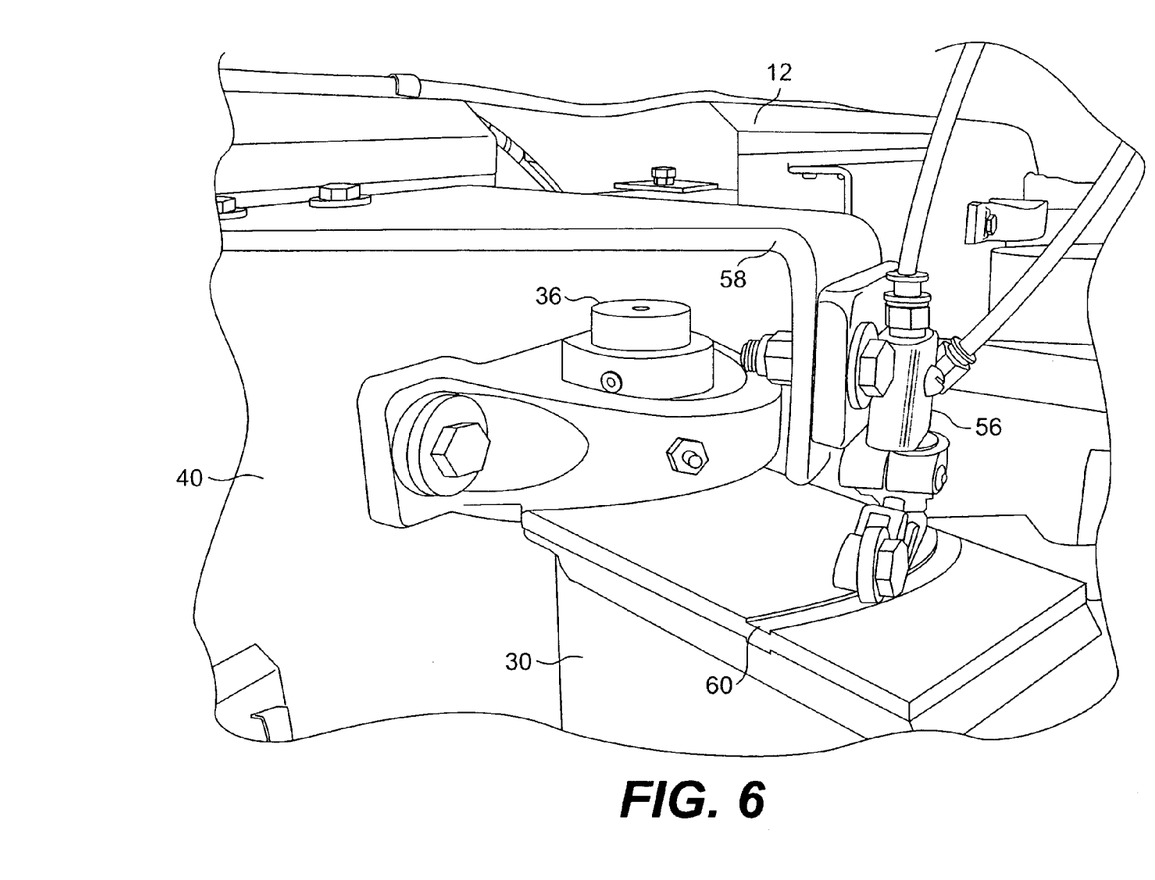
FIG. 6 is an enlarged prospective view illustrating a limit switch for control means which is activated and deactivated by movement of a brush support arm.

As shown in FIGS. 3 and 6, a limit switch 56 mounted on a support bracket 58 attached to frame 12 is positioned above at least one support arm 30 for engagement by the support arm as the support arm pivots through its range of movement. The limit switch 56 controls one or more air cylinders 38 which activate the carriages 34 when the limit switches are on. While one limit switch is shown for each arm 30 in FIG. 3, in a preferred embodiment, only one limit switch is used to control movement of both cylinders 38. As shown in FIG. 6, the brush support arm 30 may have a grove 60 in the top surface thereof in which the bottom of the limit switch rides.

As shown in FIG. 3, a bumper assembly, generally indicated by the numeral 64, is mounted to the frame 12 between each two spaced brush assemblies 28. Each bumper assembly 64 includes a rigid mounting arm 66 attached to the frame 12 at a point between two brush arm support mechanisms 34. A swingable bumper arm 68 is pivotally attached adjacent an outer end of the mounting arm 66 and is connected to one of the carriages 40 of a brush arm support mechanism 34 by a connecting rod 70 as shown in FIG. 3. Movement of the carriage of the brush support arm mechanism causes corresponding movement of the bumper arm by the connecting rod so that one or more ends of the bumper arm contact at least one of the brush support arms 30 to retard movement thereof during washing of the vehicle.

The bumper arm 68 includes telescoping ends 71 which have bumper rollers 72 at the ends thereof. The telescoping end permits the length of the bumper arm 68 to be varied. The bumper rollers 72 are designed to make rolling contact with the brush support arms 30. A fixed or rigid bumper 74 is attached to the bumper arm 68 at the midpoint thereof. In addition, a flexible safety connector or chain 76 connects each side of bumper arm 68 to a brush support arm 30.

As further shown in FIGS. 2 and 3, the mounting arm 66 has a bumper 78 on each side thereof to limit the extent to which bumper arm 68 may pivot inwardly in either direction.

The operation of the vehicle washing apparatus of the present invention will now be described with reference to FIGS. 7A-7J showing rotary brushes 14 and 16. Rotary brushes 18 and 20 operate in the same fashion.

Figure 7A:
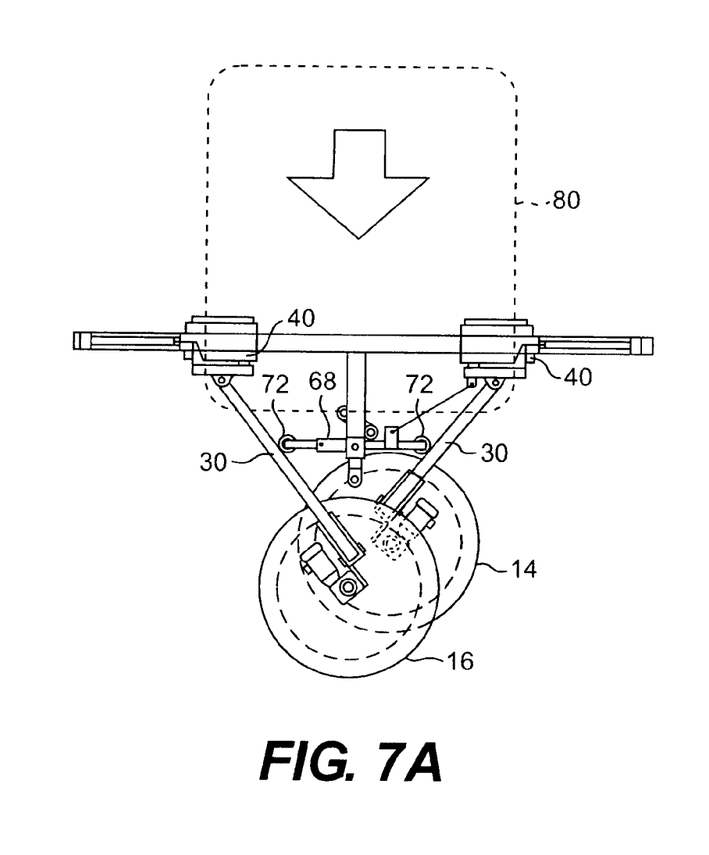
FIGS. 7A-7J are schematic top plan views illustrating various positions of the brush assemblies and the bumper assembly as a vehicle passes through the vehicle washing apparatus of the present invention.
Figure 7B:
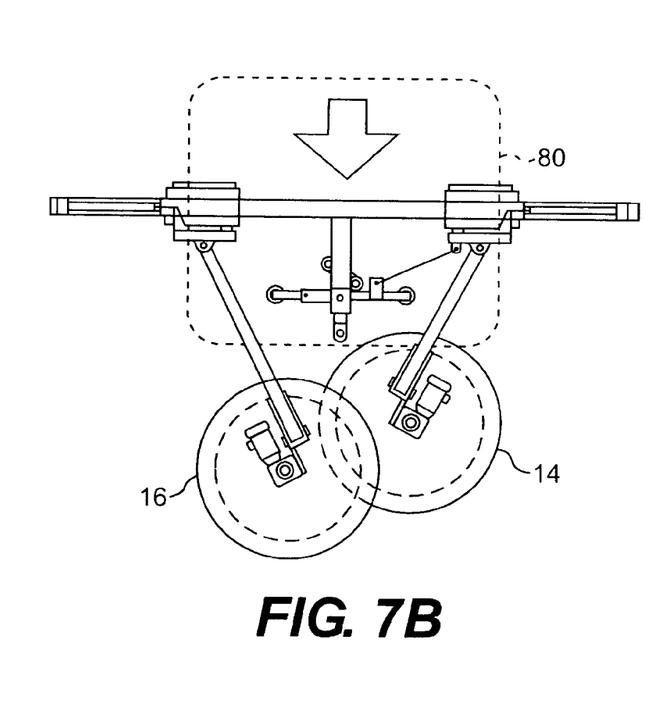
Figure 7C:
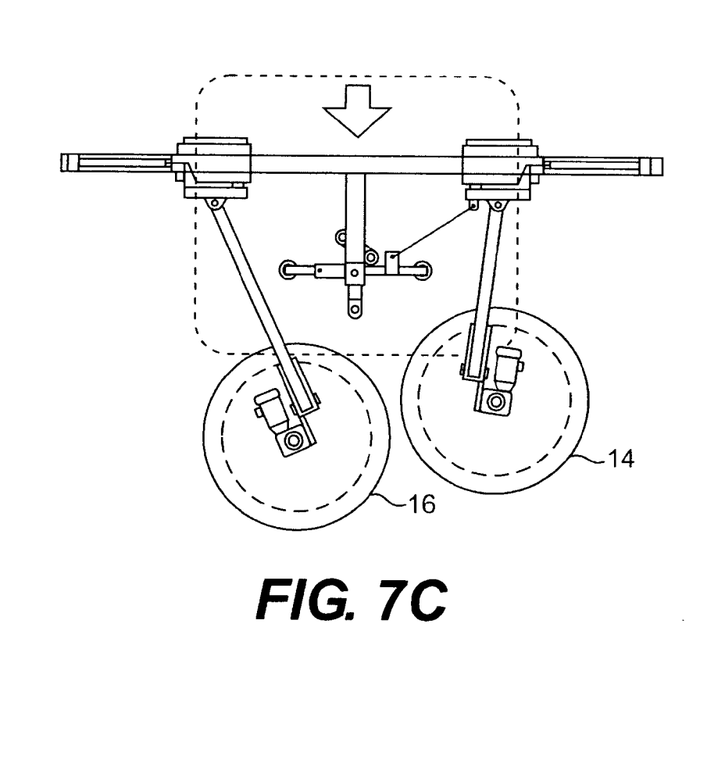

As shown in FIG. 7A, the brushes 14 and 16 initially are in a closed position whereby the brushes are generally in the center of the path of a vehicle 80 to be washed and the carriages 40 are adjacent the outside of the path of the vehicle to be washed. The brush support arm for the brush 16 is longer than the brush support arm for the brush 14 so that the brushes overlap on each side of the center of the path the vehicle to be washed. When the brushes are in the initial or home position as shown in FIG. 7A, the roller bumpers 72 at the ends of the bumper arm 68 engage the brush support arms 30 on either side. As shown in FIG. 7B, as the vehicle contacts the first brush 14, the brush 14 begins to move to the right across the front of the vehicle and the brush 16 is pivoted outwardly away from the front of the vehicle. As the vehicle continues to move through the washing apparatus, as shown in FIG. 7C, the brush 14 moves around the front right corner of the vehicle and brush 16 comes in contact with the front of the vehicle and begins to move across the front to the left front corner of the vehicle.

Figure 7D:
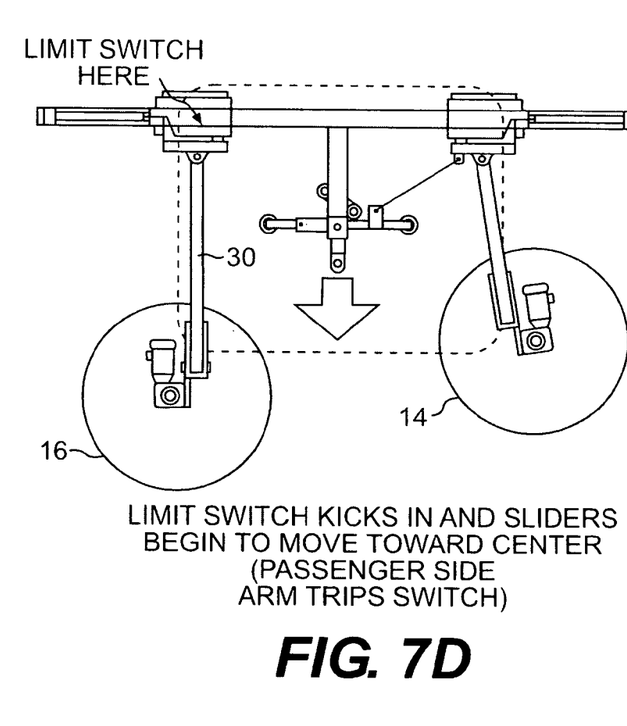
Figure 7E:
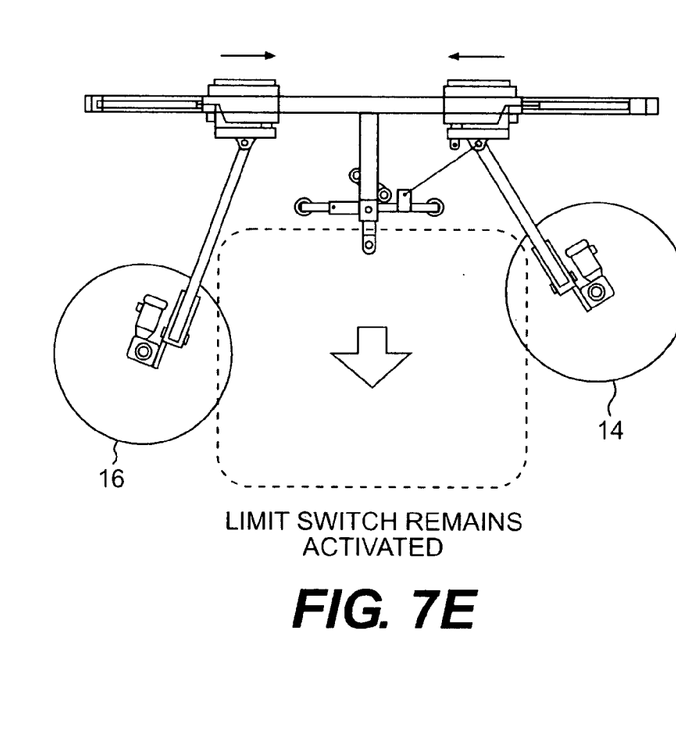
Figure 7F:
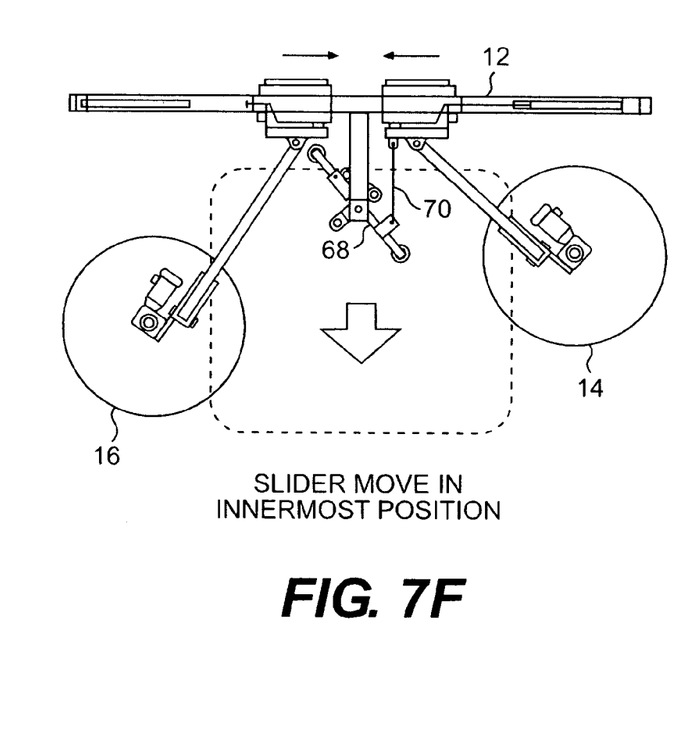

When the brushes reach the position shown in FIG. 7D, at least one limit switch associated with the brush arm 30 of the brush 16 is activated and the carriages or sliders begin to move towards the center. As the brushes continue to move along the sides of the vehicle as shown in FIG. 7E, the limit switch remains activated and the carriages continue their movement towards the center of frame 12. As shown in FIG. 7F, as the carriages move to their innermost position, the connecting rod 70 causes the bumper arm 68 to pivot to an angular position thereby the end closest to the brush 14 is positioned outwardly from the frame and the end of the bumper arm closest to the brush 16 as moves to a position closer to the frame 12.

Figure 7G:
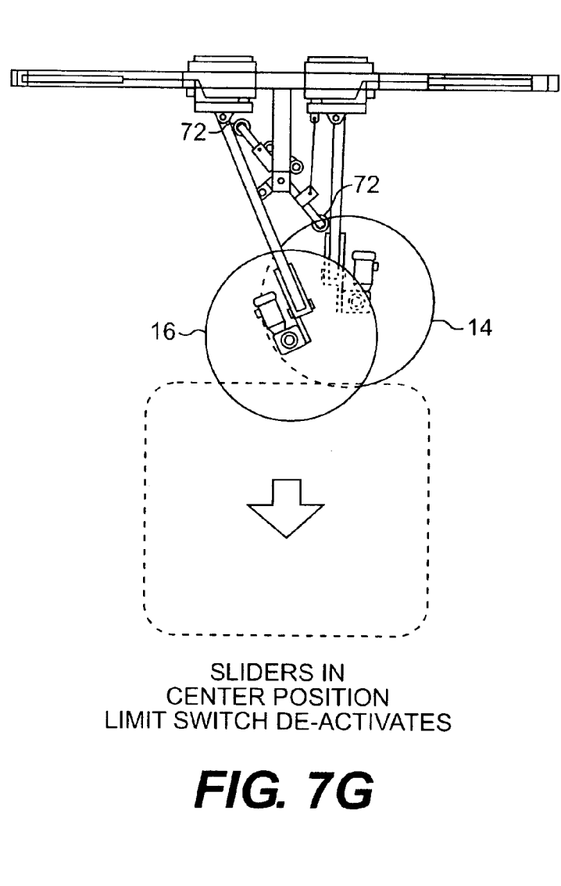
Figure 7H:
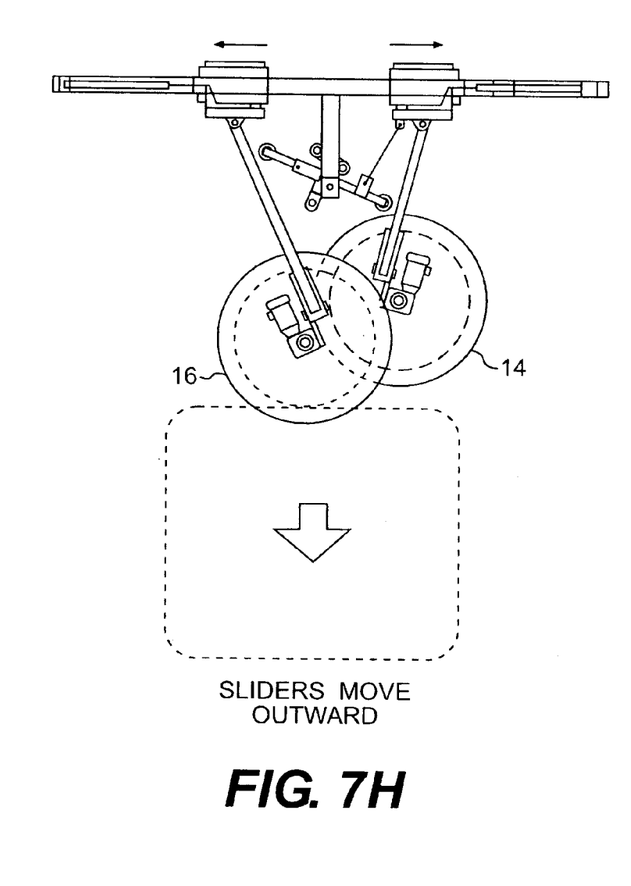
Figure 7I:
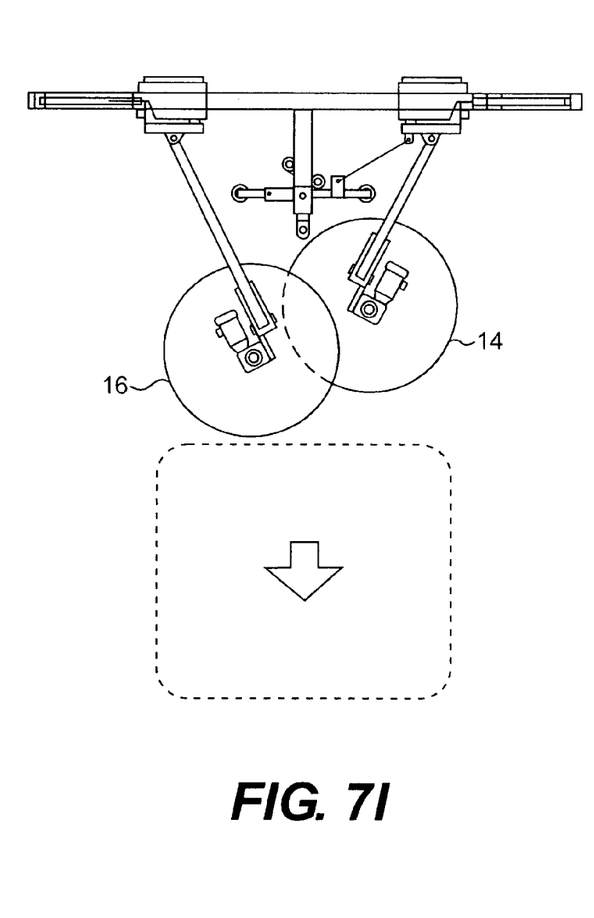
Figure 7J:
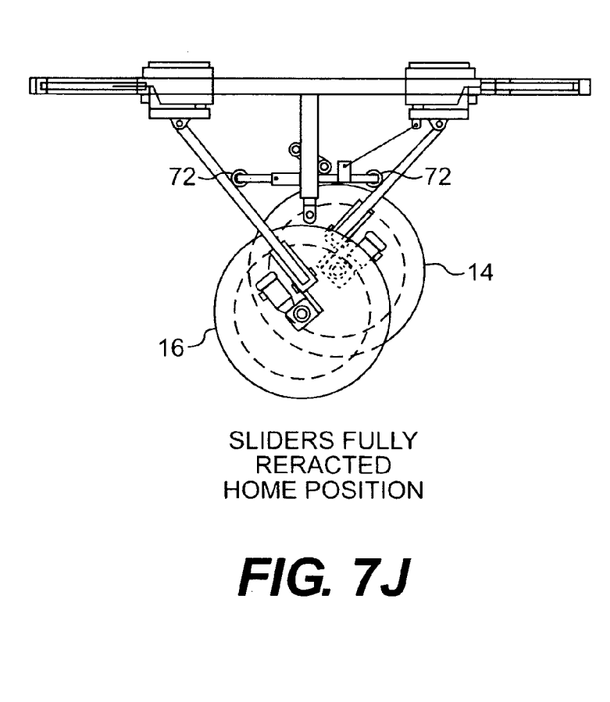

As the brushes continue their movement around the vehicle and contact the rear thereof, the sliders move to the innermost or center position, as shown in FIG. 7G, and the limit switch deactivates. In this position, the roller bumpers 72 are in contact with the brush support arms of both the brush 14 and the brush 16 and, therefore, prevent the brushes from colliding with each other and also ensure that the brushes stay in contact with the rear of the vehicle so that the brushes do not ricochet off the rear of the vehicle and leave unwashed portions thereof. As shown in FIG. 7H, as the vehicle continues to move through the brushes, the sliders begin to move outwardly and the roller bumpers 72 lose contact with the brush arms 30. As the vehicle completes its contact with the brushes, the sliders continue to move outwardly and the bumper arm 68 returns to its normal position perpendicular to mounting arm 66. Finally, when the carriages fully retracted and in their home or beginning position, as shown in FIG. 7J, the roller bumpers 72 contact the brush support arms 30 again and keep the brushes from totally colliding with each other.

The construction of the present invention affords several advantages. The bumper assembly not only keeps the brushes from totally colliding with each other, but also retard movement of the brushes at certain points in their movement around the surface of a vehicle such as when the brushes reach the rear of the vehicle. At that point, the bumper assembly keeps the brushes in better contact with the rear of the vehicle and avoids the brushes ricocheting off the surface of the vehicle and leaving unwashed portions of the vehicle.

Numerous other modifications and adaptations of the present invention will be apparent to those skilled in the art and thus, it is intended by the following claims to cover all such modifications and adaptations which fall within the true spirit and scope of the invention.

I claim:

1. A vehicle washing apparatus comprising:
   a supporting frame extending overhead of a path of a vehicle to be washed;
   a pair of spaced brush assemblies mounted on said frame, each of said brush assemblies including:
      a movable brush support arm mechanism mounted on said frame for lateral movement with respect to said path, along said frame and a brush support arm pivotally mounted at an inner end to said movable brush support arm mechanism and having a brush rototably mounted at an outer end thereof; and
   a bumper assembly mounted to said frame between said spaced brush assemblies, said bumper assembly comprising:
      a mounting arm attached to said frame; and
      a bumper arm pivotally attached adjacent an outer end of said mounting arm and connected to one of said movable brush support arm mechanisms whereby movement of said one brush support arm mechanism causes movement of said bumper arm so that one end of said bumper arm contacts at least one of said brush support arms to retard movement thereof during washing of a vehicle.

2. A vehicle washing apparatus according to claim 1, wherein said bumper arm has a bumper at each end thereof.

3. A vehicle washing apparatus according to claim 2, wherein said bumper is a roller bumper.

4. A vehicle washing apparatus according to claim 1, wherein at least one end of said bumper arm is adjustable lengthwise of said arm.

5. A vehicle washing apparatus according to claim 1, wherein said bumper arm has a fixed bumper mounted on a center portion thereof.

6. A vehicle washing apparatus according to claim 1, which further includes a stop bumper on each side of said mounting arm to limit rotational movement of said bumper arm.

7. A vehicle washing apparatus according to claim 1 wherein each of said movable brush support arm mechanisms includes a movable carriage and said bumper arm is connected to one of said carriages by a connecting rod pivotally attached at one end to said one carriage and pivotally attached at an opposite end to said bumper arm.

8. A vehicle washing apparatus according to claim 1, which further includes flexible safety connectors connecting said bumper arm to said brush support arms.

9. A vehicle washing apparatus according to claim 1, which further includes control means connected between said frame and each said movable brush support arm mechanism to control movement of each said movable brush support arm mechanism.

10. A vehicle washing apparatus according to claim 9, wherein said control means includes an actuator for moving each of said movable brush support arm mechanisms and a limit switch activated by movement of one of said brush support arms for controlling movement of each of said actuators.

11. A vehicle washing apparatus according to claim 1, wherein each of said brush support arm mechanisms includes a carriage having a plurality of rollers and said washing apparatus further comprises a plurality of tracks engaged by said rollers, with at least one of said tracks having a V-shaped surface for engaging at least one of said rollers having a V-shaped outer surface and another one of said tracks having a flat surface for engaging at least another one of said rollers having a flat outer surface.

12. A vehicle washing apparatus comprising:
   a supporting frame extending overhead of a path of a vehicle to be washed;

a pair of spaced, movable brush support arm mechanisms mounted on said frame for lateral movement with respect to said path, along said frame;

each of said movable brush arm mechanisms including a movable carriage;

a brush support arm pivotally mounted at an inner end thereof to each said movable brush support arm mechanism and having a brush mounted at an outer end thereof;

a mounting arm attached to said frame between said pair of movable brush support arm mechanisms; and a bumper arm pivotally attached adjacent an outer end of said mounting arm and connected to one of said movable brush support arm mechanisms by a connecting rod pivotablly attached at one end to the carriage of said one movable brush support arm mechanism and pivotally attached at an opposite end to said bumper arm whereby movement of said one brush support arm mechanism causes movement of said bumper arm so that one end of said bumper arm contacts at least one of said brush support arms to retard movement thereof during washing of a vehicle.

13. A vehicle washing apparatus according to claim 12, wherein said bumper arm has a bumper at each end thereof.

14. A vehicle washing apparatus according to claim 13, wherein said bumper is a roller bumper.

15. A vehicle washing apparatus according to claim 12, wherein at least one end of said bumper arm is adjustable lengthwise of said arm.

16. A vehicle washing apparatus according to claim 12, wherein said bumper arm has a fixed bumper mounted on a center portion thereof.

17. A vehicle washing apparatus according to claim 12, which further includes a stop bumper on each side of said mounting arm to limit rotational movement of said bumper arm.

18. A vehicle washing apparatus according to claim 12, which further includes flexible safety connectors connecting said bumper arm to said brush support arms.

19. A vehicle washing apparatus according to claim 12, which further includes control means connected between said frame and each said movable brush support arm mechanism to control movement of each said movable brush support arm mechanism.

20. A vehicle washing apparatus according to claim 19, wherein said control means includes an actuator for moving each of said movable brush support arm mechanisms and a limit switch activated by one of said brush support arms for controlling movement of said actuator.

21. A vehicle washing apparatus comprising:

a supporting frame extending overhead of a path of a vehicle to be washed;

a pair of spaced upper tracks and a pair of spaced lower tracks mounted on said frame overhead of said path, with one of said tracks having a flat bearing surface and three of said tracks having V-shaped bearing surfaces;

a pair of spaced, movable brush support arm mechanisms mounted on said frame for lateral movement with respect to said path, along said tracks;

each of said movable brush support arm mechanisms including a carriage having two pairs of spaced upper rollers which engage said pair of upper tracks and two pairs of spaced lower rollers which engage said pair of lower tracks, with one pair of rollers having flat outer surfaces which engage said one track having a flat bearing surface and three pairs of rollers having a V-shaped outer surface which engage said tracks having V-shaped bearing surfaces; and a brush support arm pivotally mounted at an inner end thereof to each said carriage and having a brush mounted at an outer end thereof.

* * * * *